Oct. 19, 1965 P. W. JENSEN 3,213,192

MAGNETIC TAPE RECORDING AND REPRODUCING SYSTEM

Filed Sept. 12, 1961 4 Sheets-Sheet 1

PETER W. JENSEN
INVENTOR.

BY Nathan N. Kallman

ATTORNEY

MAGNETIC TAPE RECORDING AND REPRODUCING SYSTEM

Filed Sept. 12, 1961 4 Sheets-Sheet 2

PETER W. JENSEN
INVENTOR.

BY Nathan N. Kallman

ATTORNEY

MAGNETIC TAPE RECORDING AND REPRODUCING SYSTEM

Filed Sept. 12, 1961 4 Sheets-Sheet 3

PETER W. JENSEN
INVENTOR.
BY Nathan N. Kallman
ATTORNEY

MAGNETIC TAPE RECORDING AND REPRODUCING SYSTEM

Filed Sept. 12, 1961 4 Sheets-Sheet 4

PETER W. JENSEN
INVENTOR.
BY Nathan N. Kallman
ATTORNEY

United States Patent Office 3,213,192

Patented Oct. 19, 1965

3,213,192

MAGNETIC TAPE RECORDING AND REPRODUCING SYSTEM

Peter W. Jensen, Fremont, Calif., assignor to Ampex Corporation, Redwood City, Calif., a corporation of California Filed Sept. 12, 1961, Ser. No. 137,680
8 Claims. (Cl. 178—5.4)

This invention relates to recording and reproducing systems and particularly to systems for recording and reproducing information with an extremely high order of time base stability.

In modern systems for storing data there is a constant need to increase the amount of information which is recorded and also to better the precision with which the information can be reproduced. In instrumentation applications, for example, a great deal of information must often be accumulated at very high speeds, and subsequently reproduced for analysis and further processing. In digital data processing systems, the speeds and repetition rates of computing circuits and sub-systems are continually being improved, so that it is now feasible to use repetition rates in excess of one megacycle (hereafter mc.) per second. Although digital data processing systems often use an intermediate buffer system for synchronization with a high capacity tape recording and reproducing system, most digital data transports do not permit accurate recording at the speeds and with the densities which are desired, even if an extensive buffer system is employed. These are examples merely which illustrate that there is an increasing demand for wideband and high density systems, but that there is also a concurrent increasingly severe requirement for high precision.

Perhaps the best example of the extreme requirements imposed on systems of this type is found in the recording and reproducing of a color television signal. After color television signals have been recorded by a wideband recording system, they must be reproduced (in the United States, for example) with sufficient quality to meet the stringent standards of the Federal Communications Commission.

Superior results in recording and reproducing wideband signals are obtained by systems which use a substantially, or at least partially, transverse scan of a relatively wide tape by a rotating magnetic head assembly having one or more magnetic heads. A high relative speed is obtained between head and tape by rotation of the head concurrently with advance of the tape. The transverse track system has a great many advantages, both mechanically and electronically, because it is arranged to provide certain independent but cumulative corrections for variations encountered in tape motion. For example, a timing signal may be recorded on the tape to represent variations in the head speed during recording, and to control both the speed of the drive capstan for the tape and the speed of the reproducing heads during reproduction. Adjustments may also be made in the position of a guide mechanism which holds the tape against the head mechanism, so as to compensate for tape shrinkage and stretch effects.

Concurrently with the operation of such control systems, it has been shown to be feasible to further compensate for variations in the reproduced signal by electronic means subsequent to playback of the signal by the heads. Such compensation may be effected by an electronically variable delay line which is controlled by timing components in the reproduced signal or by an externally generated reference signal, or both. Even such systems have not been fully satisfactory, however, in meeting the stringent requirements imposed by color television signals.

The color television signal is defined by a luminance component which corresponds essentially to the wideband monochrome signal and a specified chrominance subcarrier which consists of two components, in phase quadrature, which are separately modulated so as to represent the needed color information. The resultant of the two quadrature color signal vectors represents color or hue information by instantaneous phase, and color saturation information by instantaneous amplitude values. The reference for the chrominance subcarrier is found in the color synchronizing bursts which are inserted following each horizontal pulse. The reproduced video color signal must always be at, or very close to, the proper phase defined by the color bursts in order for the vectorial components to be extracted. The chrominance subcarrier is specified as having a nominal frequency of 3.579545 mc. $\pm 0.0003\%$ with a maximum rate of change which is not to exceed $\frac{1}{10}$ cycle per second. Preferably, the phase variation in the reproduced color subcarrier should not exceed 5° from the established standard if objectionable color effects are not to be introduced into the picture which is presented by conventional color television receivers. Previously, in order to overcome phase and other time base variations it has been necessary to use heterodyning, mixing and filtering techniques involving extraction and recombination of separate components of the color signal. Such processes, however, result in a considerable loss of resolution in the displayed picture.

It is therefore an object of the present invention to provide an improved system for the precise recording and reproduction of electrical signals.

Another object of the invention is to provide a system for establishing a high order of time base stability in signals reproduced from a wideband data recording and reproducing system.

Yet another object of the present invention is to provide an improved recording and reproducing system capable of providing a fully satisfactory color television signal for transmission.

Recording and reproducing systems in accordance with the invention utilize electronic correction of the time base of signals reproduced from a wideband recording system. Sampling signals derived from a part of the reproduced signal are compared in phase to a standard and utilized to introduce a precise final compensation for variations existing in the reproduced signal.

A feature of the present invention is the utilization of successive corrections of the time base of signals reproduced by a transverse track recording and reproducing system. The time base compensation is first effected by a mechanical compensation and correction, then by a first variable electronic delay control and then by a second and more precise electronic delay control.

Another feature of systems in accordance with the invention is the provision of an electronic time base adjustment circuit which is controlled by the phase relationship of the color bursts to a reference signal. A selected component of the color burst is extracted and used to control sampling of the instantaneous value of a sawtooth reference waveform, and an error signal is generated which very accurately adjusts a delay introduced by an electronically variable delay line so as to return the composite television signals to the proper time base. The time corrections to the video components are made on a line-by-line basis. Particularly useful aspects of these circuits are concerned with the manner in which selected parts of the color burst are derived and used in the generation of an error signal.

The circuits have particular utility because they may be added to existing recording systems which require an improvement in their time base stability characteristics.

A better understanding of the invention may be had by reference to the following description, taken in conjunction with the accompanying drawings, in which.

Figure 1:
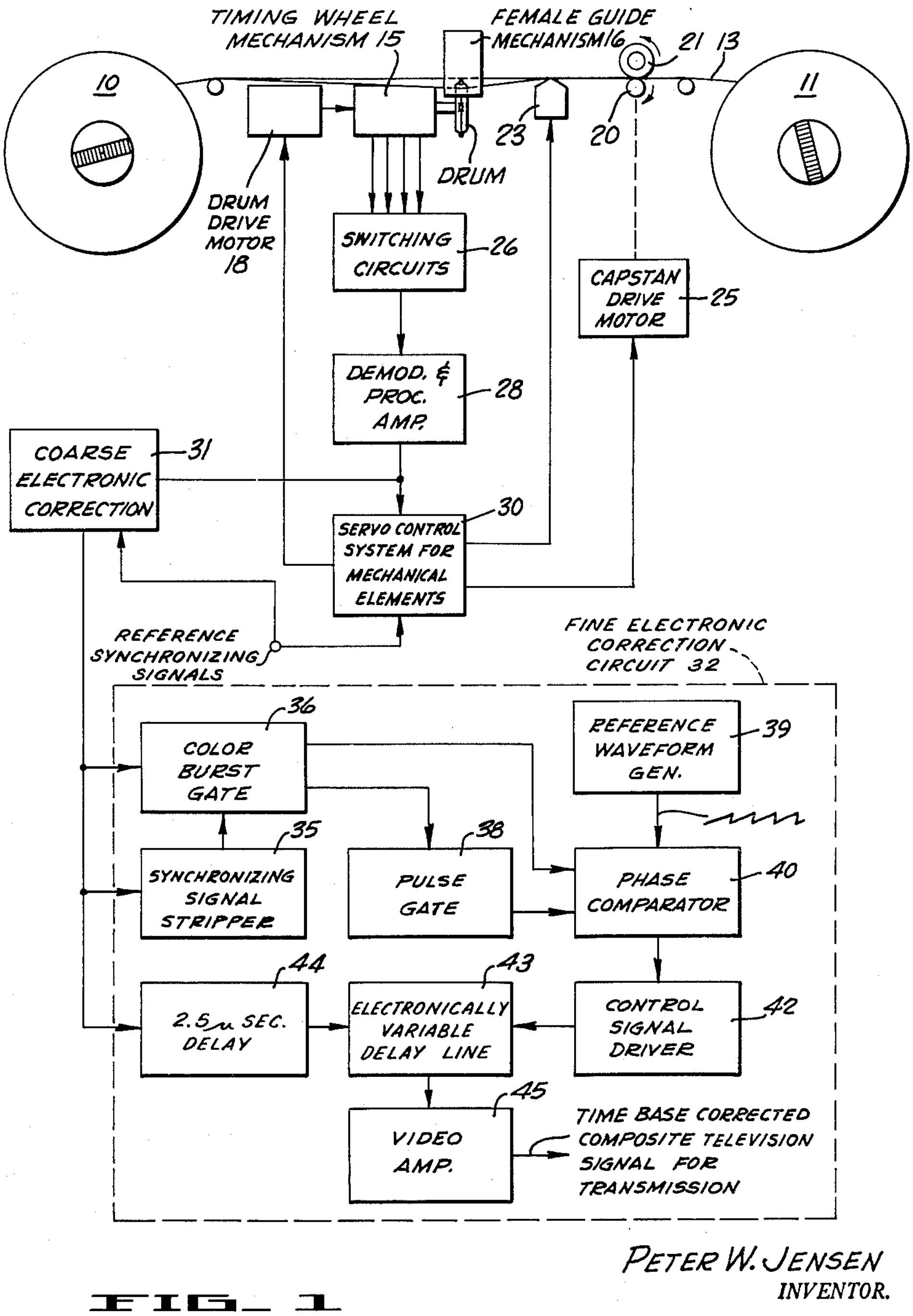
FIGURE 1 is a block diagram of a magnetic tape signal reproducing system in accordance with the present invention.

An example of a wideband recording and reproducing system in accordance with the invention is shown in block diagram form in FIGURE 1. FIGURE 1 illustrates the type of system in which a multiple magnetic head drum scans transversely across a tape, with each head upon the drum sweeping out a different transverse track. In the playback mode, information is reproduced by signals from the different heads successively to reconstitute the original signal. For simplicity, only the principal elements concerned with the playback mode have been shown, the principal operating units used during recording being substantially the same and their arrangement and use being well understood by those skilled in the art. The signal which it is desired to reproduce with a high degree of time base stability is here the color television signal, according to the standards of the United States Federal Communications Commission mentioned above. It will be evident to those skilled in the art, however, that the features of the invention may also be employed in conjunction with longitudinal recording systems, and for the precise reproduction of other forms of data involving wideband coverage or high repetition rates.

The mechanism includes a supply reel 10 and a takeup reel 11 between which a tape 13 is fed past the operative recording and reproducing system. The system for insuring continuity of tape movement without undue stresses between the supply and tapeup reels 10 and 11 has not been shown in order to simplify the presentation. Similarly, the cupping of the relatively wide tape 13 about the head drum and timing wheel mechanism 15 used with transverse track mechanisms has not been shown in detail. This cupping of the tape 13 is established by a female guide mechanism 16 which operates under control of an associated system (not shown) to maintain the desired relationship between the magnetic heads on the drum and the recording tape 13. The head drum mechanism 15 is driven by a servo drive motor 18 at a specified rate of speed during recording, although this rate is subject to minor variations. The head drum mechanism 15 is controlled during playback to vary in accordance with the actual speed changes which occurred during recording. Longitudinal movement of the tape 13 is effected by a capstan 20 which is urged against the tape 13 by a pinch roller 21. During operation in the recording mode, a timing signal is recorded longitudinally on the tape 13 by a magnetic head 23 disposed adjacent the edge of the tape. On playback, the head 23 positioned along the edge of the tape 13 reproduces the timing signals for servo control purposes. The speed of the drum motor 18 and a capstan drive motor 25 may be governed by the timing signals, or by other techniques if desired.

In a widely adopted and precise transverse track recording system, four heads are positioned symmetrically on the circumference of the head drum, with at least one of the heads reproducing signals at any given time. The signals derived in separate channels from the head drum mechanism 15 are coupled to switching circuits 26 which are controlled by the timing signals so as to smoothly recombine signals from the separate channels and reconstitute the composite television signal. For wideband recordings, the signals are usually frequency modulated, and the desired composite television signal is derived from demodulator and processing amplifier circuits 28.

The mechanical elements of this system, namely the drum mechanism 15 and the capstan 20, are operated at controlled variable rates by a servo control system 30. For achieving precise mechanical control under a wide variety of conditions, it is preferred to employ a system such as that described in U.S. Patent No. 3,017,462, assigned to the assignee of the present invention. Such a system responds not only to the timing signals, but also to vertical and horizontal synchronizing signals in the composite television signal and to reference synchronizing signals derived from a precise stable source, to effect a precise control of drum speed and capstan speed in the playback mode. The system is particularly effective in maintaining synchronization and control over the picture despite disruption of the synchronizing signal spacings which is apt to be caused by random switching and tape editing.

It is preferred in accordance with the invention to utilize two different stages of electronic time base correction, consisting of a coarse electronic correction circuit 31 and a fine electronic correction circuit 32 coupled to receive the composite television signal successively. Different types of elcetronic correction circuits 31, 32 may be employed, or the electronic time base correction circuit described in detail hereafter may be used for both circuits.

Each of these electronic time base correction circuits may operate in response to a selected synchronizing signal or time standard components within the composite television signal and may compare this time standard to a reference signal which is independently generated. With signals other than television signals the timing indicia may be provided by separated timing pulses or bursts occurring at precise and known intervals. The coarse electronic correction circuit 31 may operate to compare synchronizing signals which are present in the composite television signal with a reference signal which is maintained stable at the nominal frequency of the horizontal synchronizing signal. As described in more detail hereafter, the fined electronic correction circuit 32 effects a final ultra-precise adjustment by using a phase comparison between selected parts of the color burst and a reference waveform.

It will be appreciated that this final adjustment is necessarily a particularly critical and sensitive one. For color television, the time base should be corrected to less than about 5 nanoseconds deviation. Therefore, a great many factors, such as power supply variations, transients, component aging and like effects may have adverse effects which must be compensated for. The fine correction circuit 32 designated by the dotted line rectangle of FIGURE 1, however, provides a particularly economical and reliable arrangement for overcoming such problems. Only the principal elements are shown in FIGURE 1, these elements being similarly designated and numbered in the more detailed block diagram of FIGURE 2.

Figure 2:
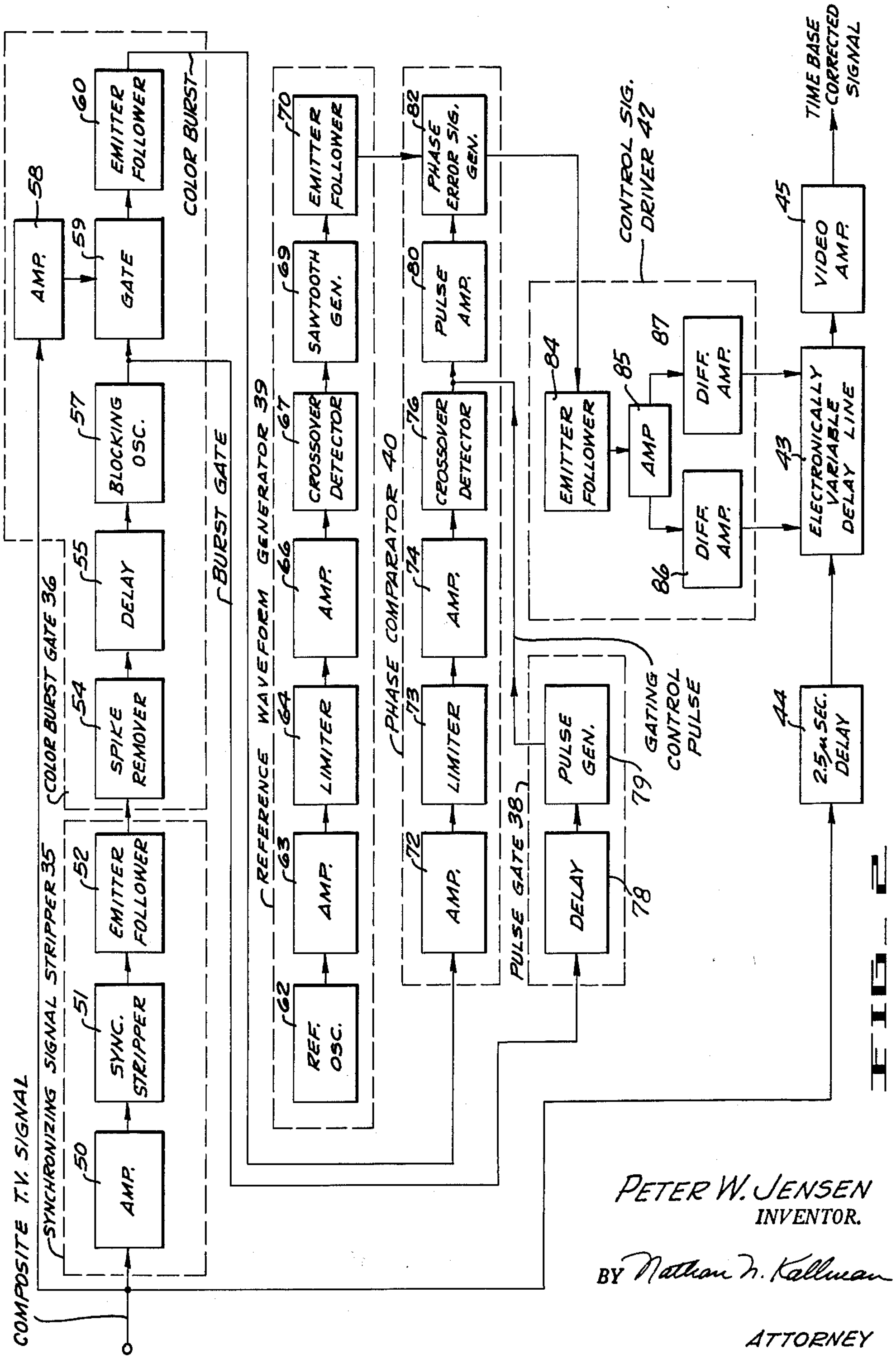
FIGURE 2 is a detail block diagram of the elements employed in a time base correction system in accordance with the invention.

For ease of understanding, a brief description of the arrangement and operation of the fine electronic correction circuit 32 shown in FIGURES 1 and 2 may be helpful. The partially time base corrected composite television signal which is derived from the coarse electronic correction circuit 31 is applied within the fine electronic correction circuit 32 to a synchronizing signal stripper circuit 35, more simply known as a sync stripper, which extracts the horizontal synchronizing pulse component contained in the composite television signal. The horizontal synchronizing pulse is followed by the color burst, which as described above provides both the phase and frequency reference for the chrominance and luminance components in the composite television signal. The horizontal synchronizing pulse is effectively delayed and used as a timing reference for the subsequent color burst, which is passed by a color burst gate 36 to a pulse gate 38. The pulse gate 38 selects particular characteristics in the color burst as samples of the actual phase of the color burst and provides sampling pulses from each color burst. Concurrently, a reference waveform generator 39 which provides a sawtooth wave is held stable at the specified chrominance subcarrier frequency. A phase comparison is made by sampling the instantaneous amplitude of the sawtooth wave with the pulses from the gate 38 in a phase comparator 40 which then develops a phase error signal which is processed by a control signal driver 42 to act as a suitable control signal for an electronically variable delay line 43. The composite television signals are coupled through a 2.5 microsecond delay 44 to the signal input of the electronically variable delay line 43, which effects a line by line adjustment of the time base of the color video components in accordance with the phase comparisons derived from the succession of color bursts. The final output signal derived from a video amplifier 45 coupled to the output terminal of the electronically variable delay line 43 is then a composite television signal in which the phase of the chrominance components is maintained within the frequency standards specified for transmission.

It should particularly be noted that systems in accordance with the invention make an initial time comparison of the phase of the color burst reference signal at the start of each horizontal line, and that the variable delay line 43 thereafter maintains this adjustment until a new comparison is made. Despite the extremely close phase control which must be exercised, such circuits actually maintain the desired precision over an entire horizontal line, without disturbing drift tendencies. It had previously been considered impractical to make a very rapid and close adjustment of a delay line while also keeping the delay stable over a relatively long interval. By the use of circuits in accordance with the invention, however, this difficulty is overcome.

This operation may be better understood by reference to the more detailed block diagram of FIGURE 2, in which the functional circuits within each of the blocks of FIGURE 1 have been set out in greater detail. In the synchronizing signal stripper 35, for example, horizontal synchronizing pulses are derived from the composite television signal by successive stages consisting of an amplifier 50, a sync stripper 51, and an emitter follower circuit 52. Because this is primarily an amplitude responsive circuit, transient signal spikes may occasionally appear in the signals provided from the synchronizing signal stripper 35. Accordingly, in the color burst gate 36, a spike remover 54 is employed to discriminate against transients which might otherwise appear as false synchronizing signal information. The expedient actually used, as described in greater detail below, is a circuit which is arranged to conduct only in response to pulses having a duration greater than one microsecond. The signal which is desired for phase information, of course, is the color burst and not the horizontal synchronizing signal, so the trailing edge of the sync pulse is delayed in a delay circuit 55 prior to application to a blocking oscillator 57. The trailing edge pulse derived from the delay circuit 55 is used to trigger the blocking oscillator 57, and the delay which is introduced is precisely that needed to initiate conduction in the blocking oscillator 57 coincident with the start of the succeeding color burst. The blocking oscillator 57 then provides a single pulse of a duration which corresponds to the duration of the color burst. This blocking oscillator pulse is applied, along with amplified composite television signals provided through an amplifier 58, to a gate 59. In effect, this arrangement uses the horizontal synchronizing pulses as markers to initiate timed cycles in which immediately following color bursts are gated through to the coupled circuitry. An emitter follower 60 is employed as the output stage of the color burst gate 36.

The initial reference for the phase comparison is a time varying signal which is provided from a stable reference oscillator 62, and this reference signal is divided down to provide the horizontal and vertical synchronizing reference signals employed in the servo control system 30, and in the coarse electronic corrector 31. This oscillator 62 may be a crystal stabilized oscillator, or other form of signal generator having a time base stability which is superior to the time base stability required for the chrominance subcarrier as set out above. The frequency of the oscillator 62 may be the specified chrominance subcarrier frequency or an integral submultiple thereof. Signals from the reference oscillator 62 are directed through successive stages consisting of an amplifier 63, a limiter 65 and an amplifier 66 to a cross-over detector 67. The detector 67 is utilized to provide a precise indication of the occurrence of a specific time varying characteristic in the reference wave, in order to permit precise phase comparison. The selected characteristic in the reference wave is the positive-going zero crossing, or cross-over in the signal. Each activation of the cross-over detector 67 results in the generation of a half cycle pulse which is applied to a sawtooth generator 69. The sawtooth output voltage variation is provided by using each half cycle pulse to charge a storage capacitor, which then in linearly discharged with time in an arrangement described in more detail below. This sawtooth variation, coupled through an emitter follower 70, is used as the reference signal in the phase comparator 40.

In accordance with the present invention, a precise phase comparison is made by using only selected parts of the color burst and a timed sampling of the reference wave. In the phase comparator 40, the color burst is passed through successive stages consisting of an amplifier 72, a limiter 73, and another amplifier 74, and an input signal is applied to a cross-over detector 76 in a manner similar to that previously described in conjunction with the reference waveform generator 39. Concurrently, however, the burst gate pulse which is applied to the gate 59 in the color burst gate 36 is also applied to the pulse gate 38, which provides a gating control pulse for the cross-over detector 76. The original burst gate pulse is delayed in a delay circuit 78 before activating a pulse generator 79 to supply the gating control pulse. These pulses are applied to the output of the cross-over detector 76 and permit the generation of an output signal therefrom only when a gating control pulse is present. Use of the delayed gating control pulse from the pulse gate 38 precludes erroneous phase information which may be present at the start or the end of a color burst from being contained in the pulses provided from the cross-over detector 76. The pulse generator 79 provides a signal of selected width to permit the cross-over detector 76 to operate a given number of times during a given color burst. When the reference signal is at the frequency of the color burst, 8 pulses per burst result.

The signals from the cross-over detector 76 present information as to time base variations in the color burst as it is reproduced by the magnetic tape system. They constitute sampling pulses, and are of short duration relative to a full cycle of the chrominance subcarrier. When applied to the phase error signal generator 82 through a pulse amplifier 80, they control the sampling of the instantaneous amplitude of the sawtooth waveform from the reference waveform generator 39. The resulting error signal represents the deviation of the reproduced information from the specified time base. The phase error signal is fed to the control signal driver 42 and converted by the successive emitter follower 84, amplifier 35, and differential amplifiers 86, 87 into a compensated signal suitable for controlling the electronically variable delay line 43. The time delay introduced as a result of the phase error measurement made from a given color burst is held for an entire television line time, until another measurement is made. The chrominance and luminance components, which are subject to the same time base errors as the color burst, are thus returned to proper time relation.

This arrangement constitutes an open loop servo system which responds to the composite television signal color burst component and to a reference signal to generate an error signal which adjusts the time base of the composite television signal so as to tend to make the relative time base error zero. In practice, it is found that the input signal is reproduced faithfully with full bandwidth luminance and chrominance, and with a deviation of less than 5° from the specified time base. Furthermore, the operative circuit elements are readily set and, once set, need no further adjustment under normal conditions of use. Line to line correction in this manner is particularly advantageous for many existing systems, which would otherwise require complex signal processing to generate usable chrominance and luminance components at a sacrifice of resolution.

Because it is an open loop servo system responsive to output and reference signals alone, the arrangement may advantageously be used as a modification unit for existing systems. The time base correction system illustrated as one example may be used wherever the time base error of a television signal is not in excess of approximately 200 nanoseconds, although more satisfactory operation is achieved if the error does not exceed about 50 nanoseconds. Note that although transverse track systems are most appropriate because of their greater accuracy, circuits in accordance with the invention may also be used with longitudinal recording systems which can meet basic television or like time base requirements.

The system in accordance with the invention has been described above assuming a reference oscillator frequency equal to the chrominance subcarrier frequency. It may be desirable to use a lower reference oscillator frequency which is an integral submultiple of the chrominance subcarrier. In such a case, the system is readily adaptable for operation at a lower sampling rate based on the lower reference frequency. For example, if a reference frequency equal to one-half the subcarrier frequency is generated, the adjustment of the electronically variable delay line 43 is effected once for each two cycles of subcarrier.

Figure 3:
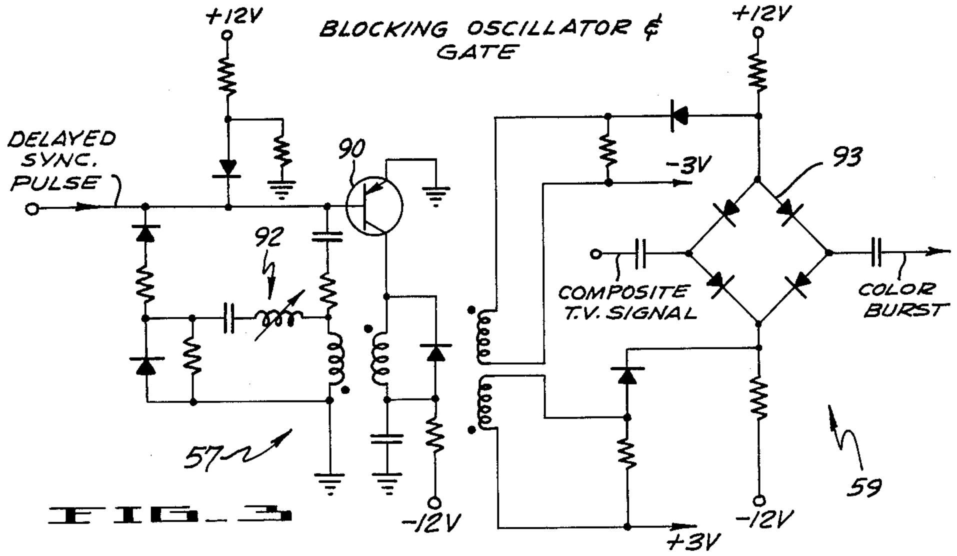
FIGURE 3 is a schematic circuit diagram of a blocking oscillator circuit and a gate circuit which may be used in the arrangement of FIGURES 1 and 2.

The various circuits in accordance with the invention may advantageously be arranged to use only solid state active elements. An example is shown in FIGURE 3, which represents a particularly satisfactory arrangement of the blocking oscillator 57 and the gate 59 of the color burst gate 36 shown in FIGURES 1 and 2. As shown, the blocking oscillator 57 utilizes a transistor 90 having a base coupled to a resonant circuit 92 and arranged to be triggered by the trailing edge of the synchronizing pulse derived after the previously introduced delay. By adjustment of variable elements in the resonant circuit, the blocking oscillator provides a pulse which is of burst width, this pulse being transformer coupled to the opposite terminals of a ring demodulator 93 in the gate 59. During the presence of the first gate signal, conduction in the transistor 90 results in signals of opposite polarity being applied to the opposing terminals of the diode bridge 93. Thus the bridge 93 is turned on for this interval, and passes the color burst component in the composite television signal. Only the color burst therefore appears as the output signal from this circuit.

Figure 4:
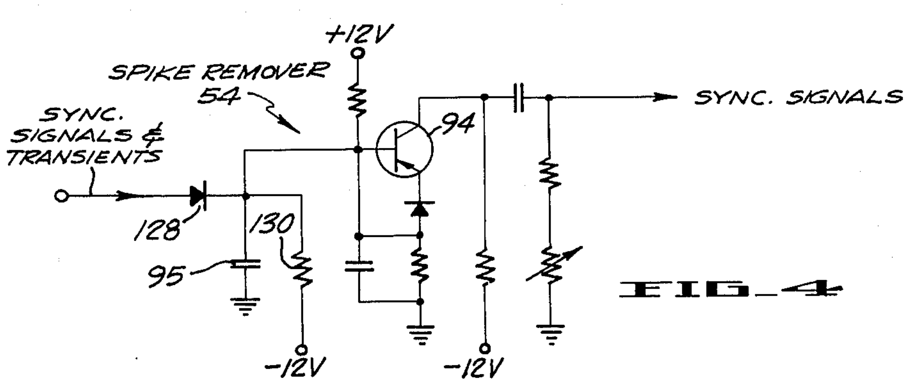
FIGURE 4 is a schematic circuit diagram of a suitable spike remover circuit.

An embodiment of the spike remover 54 that is employed in the color burst gate 36 as shown in FIGURE 2 is illustrated in FIGURE 4. The spike remover 54 includes a transistor 94 that is normally nonconducting, and becomes conducting when the emitter circuit is properly biased relative to the base. When a synchronizing signal from the sync signal stripper 35 is applied to the spike remover 54, a capacitor 95 is charged through a diode 128 to the peak voltage of the synchronizing signal, which may be +12 volts for example. As the synchronizing signal goes negative, the diode 128 becomes reverse biased and nonconducting thereby causing the capacitor 95 to discharge through a resistor 130. The time constant of the capacitor 95 and the resistor 130 determines the period of discharge. If the synchronizing pulse has a pulse width duration less than the time constant whereby the capacitor 95 does not discharge sufficiently to bias the base of transistor 94 negative relative to the emitter, the transistor will not conduct. However, when the pulse width duration of the synchronizing signal is greater than the time constant, then the transistor will conduct to provide a narrow synchronizing pulse free of transient effects. It is noted that only the leading edge of such a pulse would be effected, whereas the trailing edge of the pulse will appear at substantially the same instant.

The time constant is such that the transistor 94 does not conduct unless the applied pulse is greater than one microsecond in duration. The transients which are likely to be encountered are generally considerably shorter than this in duration, so that the synchronizing signal alone causes the transistor 94 to conduct. Because only the trailing edges of the synchronizing signals are employed in the subsequent circuits, this does not introduce a time delay into the operation.

Figure 5:
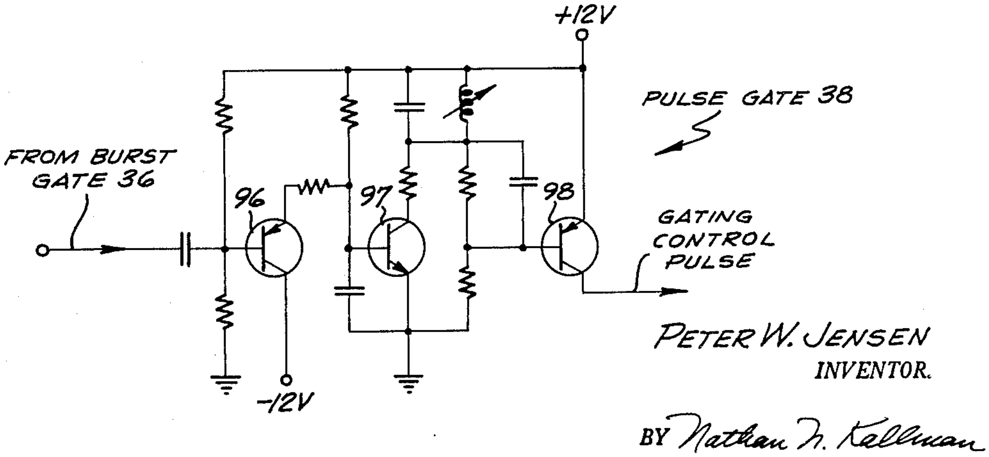
FIGURE 5 is a schematic circuit diagram of one form of pulse gate.

An example of the pulse gate circuit 38 is shown in FIGURE 5. In order to provide a pulse which is delayed relative to the original burst gate, a delay is effected in triggering an emitter follower transistor 96, and an output pulse of a selected duration is generated by succeeding amplifier transistors 97, 98 which include a tank circuit for limiting the duration of the subsequent gating control pulse.

Figure 6:
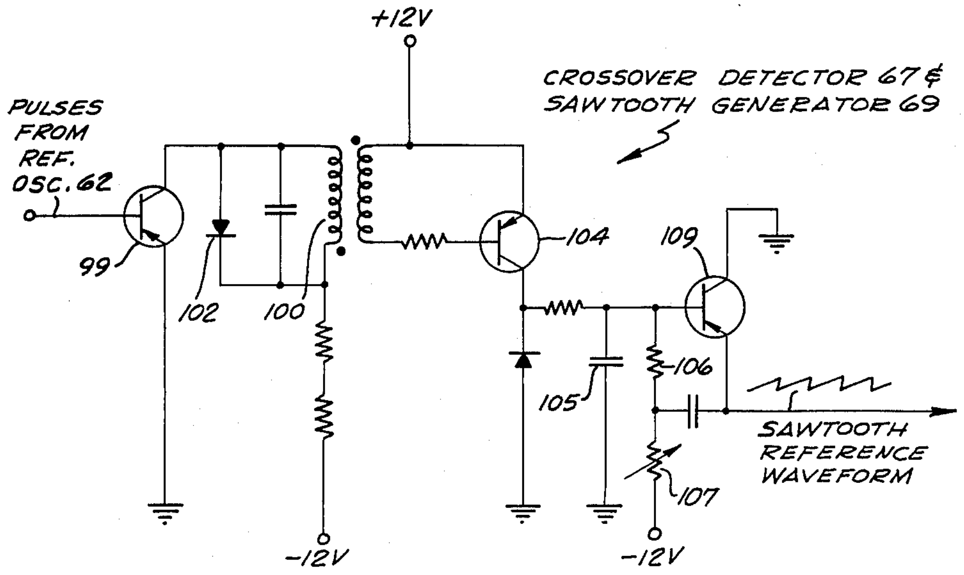
FIGURE 6 is a schematic circuit diagram of a crossover detector and sawtooth generator in accordance with the invention.

The cross-over detector circuits 67, 76 within the reference waveform generator 39 and the phase comparator 40 may be substantially alike. An example of a particularly suitable form of this circuit is shown in FIGURE 6, illustrating the cross-over detector 67 which is used in conjunction with the sawtooth generator 69 in the reference waveform generator 39. Pulses from the reference oscillator 62 are applied to the base of the transistor 99 which is normally biased on, and which is turned off by the positive swing of the input signal. When the transistor 99 is turned off, the inductance 100 in the collector circuit is caused to ring, but the ringing is limited to a half cycle by the diode 102 coupled across the inductance 100. The signal derived across the inductance 100 is transformer coupled to the base of an amplifier transistor 104, whose collector is coupled to a storage capacitor 105. The ringing of the inductance 100 therefore generates an output pulse from the transistor 104 which acts as a timing pulse that is related in time to the positive cross-over of the color burst sine wave. The transistor 104 is turned on by the timing pulse to charge the capacitor 105, which is then discharged through a resistive network 106, 107. The discharge is maintained linear through a bootstrapping action effected by a coupled emitter follower transistor 109. Accordingly, the sawtooth reference waveform is derived from this circuit, and from additional coupled emitter followers, if desired.

Figure 7:
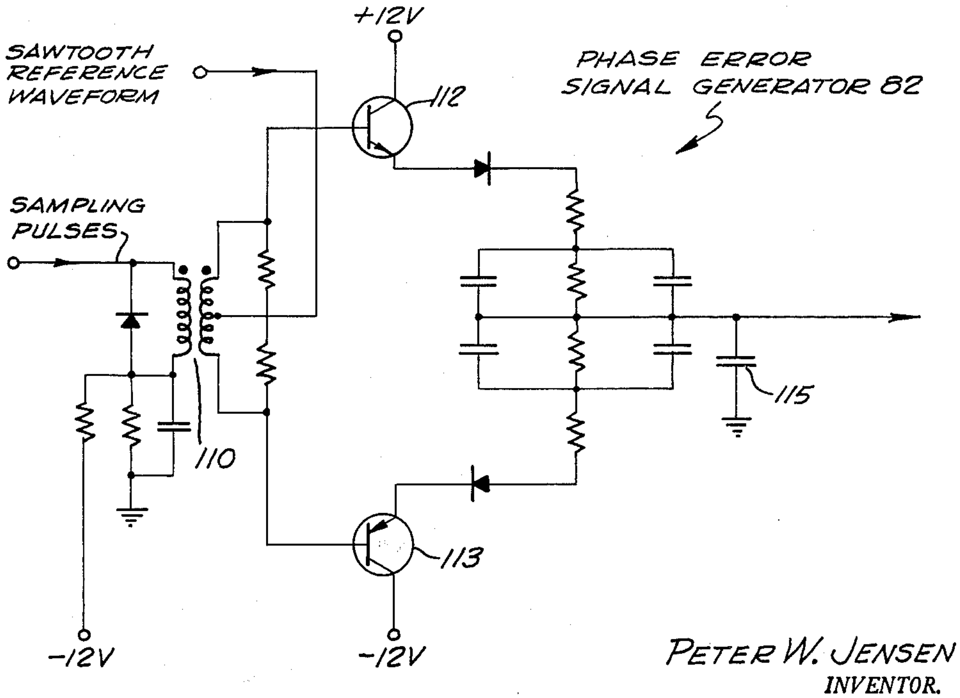
FIGURE 7 is a schematic circuit diagram of a phase error signal generator.

The phase error signal generator 82 of the phase comparator of FIGURE 2 may be arranged as shown in the schematic diagram of FIGURE 7. Sampling pulses are applied to the primary winding of a transformer 110, the center tap of the secondary being coupled to receive the sawtooth reference waveform. The opposite terminals of the secondary of the transformer 110 are coupled to the bases of a pair of transistors 112, 113 which are normally nonconducting. During the occurrence of the sampling pulse, however, the transistors 112, 113 are caused to conduct, establishing a charge on a storage capacitor 115 of the same potential level as the instantaneous voltage of the sawtooth reference waveform. The voltage across the capacitor 115 is proportional to the phase difference between the burst signal derived from the reproducing system and the reference subcarrier. Accordingly, the voltage across the capacitor 115 may be used as the error signal to control the variable delay line 43 to compensate for phase errors on a line by line basis.

While a number of alternatives have been suggested above for providing circuits for introducing a high order of time base stability in reproducing systems, it will be appreciated that the invention is not limited thereto. Accordingly, the invention should be understood to include all modifications and alternative forms falling within the scope of the appended claims.

What is claimed is:

1. A system for reducing time base error in reproduced color television signals containing color burst signals at a specified frequency including means responsive to the color television signals for extracting the color burst from the signals, means for generating a stable reference signal which is integrally related in frequency to the specified frequency of the color burst, means responsive to a selected cyclic characteristic in the stable reference signal for providing an amplitude varying phase reference, means responsive to a selected point in the cyclic characteristic of the color burst for generating a sampling pulse representative of the phase of the color burst, means responsive to the amplitude of the phase reference during the occurrence of a sampling pulse for developing a phase error signal representative of the time base error of the color burst, and electronically variable delay line means coupled to receive the color television signals and responsive to the phase error signal for adjusting the time base of the color television signals.

2. A system for reducing time base error in reproduced color television signals containing color burst signals at the trailing edge of horizontal synchronizing pulses, including means responsive to the horizontal synchronizing pulses in the color television signals for gating the color burst therefrom, reference oscillator means for generating a stable reference signal having a frequency integrally related to the specified frequency of the color burst, means responsive to a selected point in the cyclic characteristic of the stable reference signal for providing a phase reference signal whose amplitude varies linearly with time, means responsive to a selected cyclic characteristic in the color burst for generating at least one sampling pulse representative of the phase of the color burst, means controlled by the sampling pulse and responsive to the instantaneous value of the phase reference signal on the occurrence of a sampling pulse for developing a phase error signal representative of the time base error of the color burst, and electronically variable delay line means coupled to receive the color television signal and responsive to the phase error signal for adjusting the time base of the color television signals.

3. A system for reducing the time base error in reproduced color television signals which contain color burst signals at the trailing edge of horizontal synchronizing pulses, the color burst signals having a specified nominal frequency and providing a phase reference for chrominance components in the color television signals, the system including means responsive to the horizontal synchronizing pulses in the color television signals for providing burst gate signals, means responsive to the color television signals for gating the color burst under control of the burst gate signals, stable reference frequency oscillator means for generating a stable reference frequency integrally related to the specified color burst frequency, means responsive of the zero crossing characteristic in the stable reference signal for providing a phase reference waveform whose amplitude varies linearly with time in synchronism with the zero crossing characteristic, means responsive to a selected zero crossing characteristic and the gated color burst for generating at least one sampling pulse representative of the actual phase of the reproduced color burst, means responsive to the sampling pulse and coupled to receive the phase reference signal for developing a phase error signal from the instantaneous value of the phase reference signal at the time of occurrence of a sampling pulse in order to provide an indication of the time base error of the color burst, means for maintaining the phase error signals substantially constant between successive color bursts, and electronically variable delay line means coupled to receive color television signals and responsive to the phase error signal for adjusting the time base of the color television signals over each line interval occurring between each successive pair of color bursts.

4. A system for reducing time base error in composite video signals containing sinusoidally varying color burst signals including means responsive to the composite video signals for extracting the color burst signals therefrom, means for generating a stable reference frequency which is an integral submultiple of the nominal frequency of the color burst signals, means responsive to the color burst signal for generating a sampling pulse, means responsive to the stable reference and the occurrance of a sampling pulse for developing a phase error signal representative of the time base error of the composite video signal, and means coupled to receive the composite video signal and controlled by the phase error signal for variably delaying the composite video signal.

5. A system for adjusting the time base of composite video signals containing timing signal components including cyclically varying phase reference signals having a specified nominal frequency, comprising means responsive to the composite video signals for extracting the cyclically varying phase reference signals therefrom, means for providing a stable reference signal having a frequency which is subharmonically related to the specified frequency of the phase reference signal, the stable reference signal constituting a sawtooth waveform, means responsive to a selected cyclical characteristic in the phase reference for generating a sampling pulse indicative of the instantaneous phase relationship of the phase reference, means responsive to the sampling pulse and to the sawtooth waveform for developing a phase error signal representative of the instantaneous value of the sawtooth waveform at the time of occurrence of the sampling pulse, and means coupled to receive the composite video signals and controlled by the phase error signal for variably delaying the composite video signal to place the composite video signal in a selected time relationship to the stable reference signal.

6. A system for providing an ultra-precise time base in the chrominance and luminance components of a color television signal including means responsive to the color burst of the color television signal for providing at least one sampling pulse representative of the phase relationship of the color burst, means providing a stable reference signal at a submultiple of the specified frequency of the color burst, means for generating a sawtooth waveform from the stable reference signal, means responsive to the sawtooth waveform and the sampling pulse for providing a phase error signal representative of the phase relationship of the color burst to the stable reference signal, and means receiving the color television signal and controlled by the phase error signal for variably delaying the chrominance and luminance representing components of the color television signal over an entire line as determined by the phase error signal developed from the preceding color burst.

7. A system for reproducing recorded color television signals with precise time base stability including the combination of means for providing the reproduced color television signal including color burst components, means responsive to the reproduced color television signal for gating the color burst components therefrom, reference signal generator means providing a reference signal at the chrominance subcarrier frequency in the color television signal, means responsive to the reference signal for providing a reference subcarrier having a sawtooth waveform, means responsive to the color burst for generating a timing pulse therefrom, phase comparator means responsive to the reference subcarrier and the timing pulse for providing a control signal, and variable delay means responsive to the control signal and the reproduced signal for correcting the time base of the reproduced signal.

8. A magnetic tape system for reproducing wideband data with a high order of time base stability including the combination of a transverse track recording and reproducing mechanism, the mechanism including a rotating head drum assembly, a magnetic tape, a capstan longitudinally driving the tape relative to the rotating head drum assembly such that the rotating heads move transversely relative to the tape, the recorded signal including synchronizing signals having phase representative components, the mechanism including also mechanical control means coupled to the head drum and the capstan, and means for recording a timing signal representative of the head drum assembly rotation on the tape, first time base adjustment means including means responsive to the synchronizing signal components in the reproduced signal for operating the mechanical control means, a first reference signal source providing a signal related in frequency to the synchronizing signal frequency, second time base adjustment means responsive to the first reference signal and the synchronizing signals and coupled to receive the reproduced signals for variably delaying the reproduced signals in accordance with the time relationship between the first reference signal and the synchronizing signals, a second reference signal source providing a signal at the specified frequency of the phase representative components, and third time base adjustment means responsive to the second reference signal and the phase representative components, and coupled to receive the the reproduced signal as variably delayed by the second time base adjustment means, for finally variably delaying the reproduced signal in accordance with the time relationship between the second reference signal and the phase representative components.

References Cited by the Examiner

UNITED STATES PATENTS

| | | | |
|---|---|---|---|
| 2,988,593 | 6/61 | Olive | 178—5.4 |
| 3,048,665 | 8/62 | Wilcox | 178—6.6 |
| 3,049,595 | 8/62 | Johnson | 178—6.6 |
| 3,114,001 | 12/63 | Newell | 178—6.6 |

OTHER REFERENCES

RCA KCS 47; Rider's Television Manual, vol. 7, RCA pp. 7–41 and 7–47.

DAVID G. REDINBAUGH, *Primary Examiner.*

ROBERT SEGAL, *Examiner.*